United States Patent
Wu et al.

(10) Patent No.: US 10,860,798 B2
(45) Date of Patent: Dec. 8, 2020

(54) ELECTRONIC DEVICE AND METHOD FOR TEXT PROCESSING

(71) Applicant: Sony Corporation, Tokyo (JP)

(72) Inventors: Youzheng Wu, Beijing (CN); Jun Qi, Beijing (CN)

(73) Assignee: SONY CORPORATION, Tokyo (JP)

( * ) Notice: Subject to any disclaimer, the term of this patent is extended or adjusted under 35 U.S.C. 154(b) by 184 days.

(21) Appl. No.: 16/080,670

(22) PCT Filed: Mar. 21, 2017

(86) PCT No.: PCT/CN2017/077473
§ 371 (c)(1),
(2) Date: Aug. 29, 2018

(87) PCT Pub. No.: WO2017/162134
PCT Pub. Date: Sep. 28, 2017

(65) Prior Publication Data
US 2019/0018838 A1    Jan. 17, 2019

(30) Foreign Application Priority Data
Mar. 22, 2016   (CN) .......................... 2016 1 0166105

(51) Int. Cl.
*G06F 17/27*    (2006.01)
*G06F 40/289*   (2020.01)
(Continued)

(52) U.S. Cl.
CPC ............ *G06F 40/289* (2020.01); *G06F 40/10* (2020.01); *G06F 40/20* (2020.01); *G06F 40/30* (2020.01);
(Continued)

(58) Field of Classification Search
None
See application file for complete search history.

(56) References Cited

U.S. PATENT DOCUMENTS

| | | | | |
|---|---|---|---|---|
| 10,515,400 | B2* | 12/2019 | Krishnamurthy | ...... G06N 5/041 |
| 2002/0123865 | A1* | 9/2002 | Whitney | ................. G06F 17/17 |
| | | | | 702/189 |

(Continued)

FOREIGN PATENT DOCUMENTS

| | | |
|---|---|---|
| CN | 104199809 A | 12/2014 |
| CN | 104657350 A | 5/2015 |

(Continued)

OTHER PUBLICATIONS

Lai et al., "How to generate a good word embedding?" Cornell University, http://arxiv.org/abs/1507.05523, Jul. 20, 2015.*

(Continued)

*Primary Examiner* — Richard Z Zhu
(74) *Attorney, Agent, or Firm* — Xsensus LLP

(57) ABSTRACT

An electronic device and method for text processing, the electronic device comprises a processor (100), and the processor is configured to: determine a correlation between a first text vector and a second text vector, wherein the first text vector and the second text vector are multi-dimensional, real number vectors generated on the basis of a same text, respectively; obtain, according to the correlation, a third text vector representing the text, wherein a vector space in which the third text vector is located is correlated to vector spaces in which first text and second text vectors are located. The electronic device and method of the present invention can be used to create a text-feature representation model which represents text features by combining a plurality of view angles, thereby improving the performance of natural language processing.

16 Claims, 5 Drawing Sheets

(51) Int. Cl.
*G06N 3/08* (2006.01)
*G06N 5/02* (2006.01)
*G06N 3/04* (2006.01)
*G06F 40/10* (2020.01)
*G06F 40/20* (2020.01)
*G06F 40/30* (2020.01)
*G06F 40/40* (2020.01)
*G10L 25/30* (2013.01)
*G10L 15/16* (2006.01)
*G10L 15/18* (2013.01)

(52) U.S. Cl.
CPC ......... *G06N 3/0445* (2013.01); *G06N 3/0454* (2013.01); *G06N 3/0472* (2013.01); *G06N 3/084* (2013.01); *G06N 3/088* (2013.01); *G06N 5/022* (2013.01); *G06F 40/40* (2020.01); *G10L 15/16* (2013.01); *G10L 15/1822* (2013.01); *G10L 25/30* (2013.01)

(56) References Cited

U.S. PATENT DOCUMENTS

| | | | |
|---|---|---|---|
| 2004/0148154 A1 | 7/2004 | Acero et al. | |
| 2014/0067368 A1* | 3/2014 | Yih | G06F 40/30 704/9 |
| 2016/0110343 A1* | 4/2016 | Kumar Rangarajan Sridhar | G10L 25/30 704/9 |
| 2017/0053646 A1* | 2/2017 | Watanabe | G10L 15/22 |
| 2017/0060854 A1* | 3/2017 | Zeng | G06F 40/205 |
| 2017/0061958 A1* | 3/2017 | Ding | G06F 40/30 |
| 2017/0270100 A1* | 9/2017 | Audhkhasi | G06F 40/30 |
| 2017/0372696 A1* | 12/2017 | Lee | G10L 15/16 |
| 2018/0225553 A1* | 8/2018 | Ha | G06Q 30/0201 |

FOREIGN PATENT DOCUMENTS

| | | |
|---|---|---|
| CN | 104881401 A | 9/2015 |
| CN | 104915448 A | 9/2015 |

OTHER PUBLICATIONS

Dhillon et al., "Eigenwords: spectral word ennbeddings", Journal of Machine Learning Research 16, pp. 3035-3078, Dec. 2015.*
English-language translation of International Search Report and Written Opinion for International Application No. PCT/CN2017/077473 dated Jun. 20, 2017.

* cited by examiner

ELECTRONIC DEVICE AND METHOD FOR TEXT PROCESSING

This application claims priority to Chinese Patent Application No. 201610166105.3, titled "ELECTRONIC DEVICE AND METHOD FOR TEXT PROCESSING", and filed with the Chinese State Intellectual Property Office on Mar. 22, 2016, which is incorporated herein by reference in its entirety.

FIELD

The present disclosure relates to the field of natural language processing, and particularly to an electronic device and a method for text processing, which constructs a multi-view word feature representation model based on correlation between two or more word feature representation models, to implement deep shared view representation for features of the text object, for facilitating subsequent natural language processing.

BACKGROUND

In the conventional natural language understanding (NLU) algorithm, a text (for example, a word) is served as a discrete symbol, words are represented independently and discretely, and there is not large correlation between the words.

For example, "China" is represented as [0 0 0 1 0 0 0 0 0 0 0 0 0 0 0 0 . . . ], and "Beijing" is represented as [0 0 0 0 0 0 0 0 0 0 1 0 0 0 . . . ].

The dimensionality of the discrete vector is equal to the size of a dictionary. Therefore, the dimensionality is generally high. All primary tasks such as part-of-speech tagging, slot filling and named entity recognition in the field of natural language processing (NLP) can be implemented by the simple discrete representation method in cooperation with maximum entropy, support vector machine (SVM), condition random field (CRF) and other statistical model.

However, much training data is required in the discrete representation method to successfully train a statistical model, which results in large calculation amount. Also, independent representation for words cannot reflect semantic correlation between the words, which does not facilitate natural language understanding.

The word embedding technology developed in recent years remedies the disadvantage. With the word embedding technology, a discrete text (for example, a word, a phrase or a sentence) is represented as a vector in low-dimensional space. With taking a word as an example, a word vector obtained through the word embedding technology is generally represented as follows, for example: "China" is represented as [0.0172, −0.77, −0.507, 0.1, −0.42 . . . ], and "Beijing" is represented as [0.01, −0.8, −0.5, 0.123, −0.142 . . . ].

In the word embedding technology, the dimensionality of the word vector is generally 50, 100 or 300. Since a semantic relation between texts is taken into consideration in the word embedding technology, words vectors are not represented independently and have a semantic relation. In this way, not only a representation dimensionality of the word vectors is reduced greatly to reduce calculation complexity, but also such representation for word vectors facilitates a task in natural language processing and spoken language understanding.

The word embedding technology for example C&W, the Word2vec and the GloVe are widely applied in recent years.

With development of deep learning, the word embedding technology has been an indispensable important branch of the natural language processing and spoken language understanding, and is successful to some extent.

However, word feature representation is performed from one view (for example, using the same training mechanism or based on the same training corpus) in the existing word embedding technology. Such word feature representation has its limits. That is, the existing word embedding technology has an obvious advantage in a certain aspect and a disadvantage in other aspect. For example, the Word2Vec depends on a skip-grams mode or a continuous bag of words (CBOX) model to create a word vector, so as to obtain long word context. The GloVe is trained based on non-zero items in a global word co-occurrence matrix, which requires traversing a whole corpus to collect statistical information. For example, word feature representation trained through a training corpus for news reports and word feature representation trained through a training corpus for daily spoken language have its own focus and limits for semantic correlation between words.

SUMMARY

A brief summary of the present disclosure will be given below to provide basic understanding of some aspects of the present disclosure. However, it shall be appreciated that the summary is neither an exhaustive summary of the present disclosure nor intended to define essential or important parts of the present disclosure, or limit the scope of the present disclosure, but is merely for the purpose of presenting some concepts of the present disclosure in a simplified form and hereby acts as a preamble of more detailed descriptions which will be presented later.

In view of the above problems, an electronic device and a method for text processing are provided in the present disclosure, which, from multiple views, provides deep sharing view feature representation of a text object based on correlation between different text feature representation of the text object represented in different views, to optimize system performance in a case that natural language processing, spoken language understanding or other task is performed.

An electronic device for text processing is provided in an aspect of the present disclosure, the electronic device includes a processor. The processor is configured to: determine correlation between a first text vector and a second text vector which are multi-dimensional real number vectors generated based on the same text respectively; and obtain a third text vector based on the correlation to represent the text, where a vector space where the third text vector is located is related to vector spaces where the first text vector and the second text vector are located.

According to a preferred embodiment of the present disclosure, the text corresponds to a word.

According to another preferred embodiment of the present disclosure, the text corresponds to at least one of a phrase constituted by multiple words and a sentence constituted by multiple phrases.

According to another preferred embodiment of the present disclosure, the first text vector and the second text vector are based on a first word feature representation model and a second word feature representation model respectively.

According to another preferred embodiment of the present disclosure, the first word feature representation model and the second word feature representation model are obtained based on different word feature representation training mechanisms respectively.

According to another preferred embodiment of the present disclosure, the word feature representation training mechanism includes at least one of a Word2Vec mechanism, a GloVe mechanism and a C&W mechanism.

According to another preferred embodiment of the present disclosure, the processor is further configured to determine the correlation between the first text vector and the second text vector based on Canonical Correlation Analysis, and regulate parameters of the Canonical Correlation Analysis with an object of making the correlation satisfy a predetermined condition.

According to another preferred embodiment of the present disclosure, the processor is further configured to process the first text vector and the second text vector using a neural network to obtain a variable of the first text vector and a variable of the second text vector, determine the correlation based on the variable of the first text vector and the variable of the second text vector, and regulate parameters of the neural network with an object of making the correlation satisfy a predetermined condition.

According to another preferred embodiment of the present disclosure, the processor is further configured to process the variable of the first text vector and the variable of the second text vector using an auto-encoder to reconstruct the first text vector and the second text vector, and regulate parameters of the auto-encoder and the neural network with an object of further making an error between the reconstructed first text vector and the first text vector and an error between the reconstructed second text vector and the second text vector satisfy a predetermine condition, to determine the correlation.

According to another preferred embodiment of the present disclosure, the processor is further configured to, for each of multiple texts, determine a corresponding correlation between a first text vector and a second text vector, and obtain a corresponding third text vector. The electronic device further includes a memory configured to store the third text vectors of the multiple texts, to establish a multi-view text feature representation model.

According to another preferred embodiment of the present disclosure, the processor is further configured to, for each of the multiple texts, determine correlation between a first text vector and a second text vector corresponding to the text further based on the correlation regarding other texts.

A method for text processing is further provided in another aspect of the present disclosure, which includes: determining correlation between a first text vector and a second text vector which are multi-dimensional real number vectors generated based on the same text respectively; and obtaining a third text vector based on the correlation to represent the text. A vector space where the third text vector is located is related to vector spaces where the first text vector and the second text vector are located.

An electronic device for text processing is further provided in another aspect of the present disclosure, which includes: a memory configured to store a multi-view text feature representation model established with the above method; a processor configured to read the multi-view text feature representation model from the memory, and map a text object to be processed into a multi-dimensional real number vector based on the multi-view text feature representation model.

A method for text processing is further provided in another aspect of the present disclosure, which includes: reading from a memory a multi-view text feature representation model established with the above method; mapping a text object to be processed into a multi-dimensional real number vector based on the multi-view text feature representation model.

Computer program codes and a computer program product for implementing the above method in the present disclosure and a computer readable memory medium on which the computer program codes for implementing the method according to the present disclosure are recorded are provided in other aspect of the present disclosure. In addition, a computer readable memory medium in which the multi-view text feature representation model in the present disclosure is carried is further provided.

In the embodiments of the present disclosure, text features are represented in conjunction with multiple views, to establish a multi-view text feature representation model. In this way, the disadvantage of the single-view text feature representation model in the conventional technology can be remedied, to improve performance of the multi-view feature representation model applied to natural language processing.

Other aspects of the embodiments of the present disclosure are described below in the specification, in which, preferred embodiments for fully disclosing the embodiments of the present disclosure are described in detail, and are not limited thereto.

BRIEF DESCRIPTION OF THE DRAWINGS

The present disclosure is understood better with reference to detailed description given below in conjunction with the drawings, throughout which, the same or similar reference numerals denote the same or similar components. The drawings and the following detailed description are contained in the specification to form a part of the specification, to further exemplify the preferred embodiments of the present disclosure and explain the principles and advantages of the present disclosure, in the drawings.

DETAILED DESCRIPTION OF THE EMBODIMENTS

Figure 1:
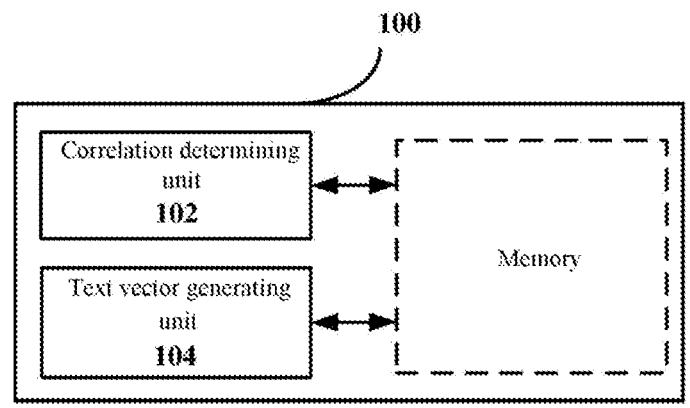
FIG. 1 is a block diagram of a function configuration example of an electronic device for text processing according to an embodiment of the present disclosure.

Exemplary embodiments of the present disclosure will be described below in conjunction with the drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system-related and business-related constraining conditions which will vary from one implementation to another. Moreover, it shall also be appreciated that such a development effort might be very complex and time-consuming but may simply be a routine task for those skilled in the art benefiting from the present disclosure.

It should further be noted that only those device structures and/or processing steps closely relevant to the solutions of the present disclosure are illustrated in the drawings while other details less relevant to the present disclosure are omitted, so as not to obscure the present disclosure due to those unnecessary details.

The embodiments of the present disclosure are described next in detail with reference to FIG. 1 to FIG. 8.

A function configuration example of an electronic device for text processing according to an embodiment of the present disclosure is described with reference to FIG. 1. FIG. 1 is a block diagram of a function configuration example of an electronic device for text processing according to an embodiment of the present disclosure.

As shown in FIG. 1, the electronic device 100 according to the embodiment may include a correlation determining unit 102 and a text vector generating unit 104. It should be noted that the correlation determining unit 102 and the text vector generating unit 104 may be a discrete physical entity or a discrete logic entity, or may be implemented by the same physical entity (for example, a central processing unit (CPU), an application specific integrated circuit (ASIC)).

The correlation determining unit 102 may be configured to determine correlation between a first text vector and a second text vector. The first text vector and the second text vector are multi-dimensional real number vectors generated based on the same text, respectively. The text may be for example a word, a phase constituted by multiple words or a sentence constituted by multiple phases.

With taking a word as an example of the text, the first text vector and the second text vector are based on a first word feature representation model and a second word feature representation model, respectively. The first word feature representation model and the second word feature representation model are established from different views. For example, the first word feature representation model and the second word feature representation model are obtained based on different word feature representation training mechanisms. Preferably, the word feature representation training mechanism may include at least one of a Word2Vec mechanism, a Glove mechanism and a C&W mechanism. That is, two mechanisms may be selected from the Word2Vec mechanism, the Glove mechanism and the C&W mechanism, as training mechanisms for the first word feature representation model and the second word feature representation model. These mechanisms are common word embedding technologies in conventional technology, and are not described in detail here anymore. As an example, the first word feature representation model is acquired based on the Word2Vec mechanism, and the second word feature representation model is acquired based on the GloVe mechanism. It should be understood that, other mainstream word feature representation training mechanism may occur with the development and the advancement of the technology, and apparently, the word feature representation model may be obtained by those skilled in the art based on the two other mainstream word feature representation training mechanisms according to the conception of the present disclosure.

In another aspect, alternatively, the first word feature representation model and the second word feature representation model may be obtained based on different training corpuses, respectively. For example, the first word feature representation model is obtained based on a generic corpus (for example, a large-scale news corpus or a webpage text), and the second word feature representation model is obtained based on the training of an intrinsic corpus (for example, a mail corpus or a spoken language corpus) of a user. The same training mechanism or different training mechanisms may be used for training the first word feature representation model and the second word feature representation model.

It should be noted that, in an example, the first word feature representation model and the second word feature representation model described above are obtained by person for executing the technical solution of the present disclosure according to a training mechanism and corpus training (in an online manner or an offline manner). For example, the word feature representation model is trained pointedly based on a language processing task thereof. In another example, the word feature representation model is acquired from the outside. For example, a word feature representation model trained by other person is acquired from an academic research sharing platform, as a word feature representation model to be fused. In addition, with taking a case that two word feature representation models are fused as an example, however, it should be understood by those skilled in the art that, more than two word feature representation models may also be fused in the present disclosure according to actual needs. For example, the first word feature representation model and the second word feature representation model are fused according to the solution of the present disclosure to obtain a fused third word feature representation model. The fused third word feature representation model may be fused with a fourth word feature representation model according to the solution of the present disclosure. Also, according to the solution of the present disclosure, the first word feature representation model and the second word feature representation model are fused to obtain a third word feature representation mode, and a fourth word feature representation model and a fifth word feature representation model are fused to obtain a sixth word feature representation model, and the third word feature representation model and the sixth word feature representation model are fused, which is not described repeatedly here anymore.

Preferably, the correlation determining unit 102 may be further configured to determine correlation between the first text vector and the second text vector based on Canonical Correlation Analysis (CCA), and regulate parameters of Canonical Correlation Analysis with an object of making the correlation satisfy a predetermined condition. The Canonical Correlation Analysis (CCA) is a common statistical analysis method for analyzing a correlation relation between two sets of vectors, and is used here to determine correlation between two sets of word feature representation (that is, word vectors) in the word embedding technology. However, it should be understood that other correlation analysis method (including an existing analysis method or an analysis method which may occur in future) may also be conceived by those skilled in the art to determine correlation between the first text vector and the second text vector.

The CCA is introduced here simply. The CCA is a standard technology of unsupervised data analysis for finding linear projection with largest correlation of two random vectors. Mathematically, two random vectors $(X_1, X_2)$ are defined, covariance matrixes of the two random vectors are defined as $(\Sigma_{11}, \Sigma_{22})$, respectively, and a cross covariance matrix is defined as $\Sigma_{12}$. $(r_1, r_2)>0$ denotes two regular items of the covariance matrix $\Sigma_{11}$ and $\Sigma_{22}$, to ensure non-specificity of sample covariance. A pair of linear projection $$(A_1^*, A_2^*)$$

with largest correlation of two views A1, A2 is tried to be found through the CCA, as shown by an expression (1) as follows.

$$\max_{A_1, A_2} tr(A_1^T \Sigma_{12} A_2) \quad (1)$$
$$\text{s.t., } A_1^T(\Sigma_{11} + r_1 I)A_1 = A_2^T(\Sigma_{22} + r_2 I)A_2 = I$$
$$u_i^T f(X)g(Y)^T v_j = 0, \forall_i \neq j.$$

The expression (1) is a classic semi-definite programming. It is assumed that an intermediate item is represented as $$T = \Sigma_{11}^{-\frac{1}{2}} \Sigma_{12} \Sigma_{22}^{-\frac{1}{2}},$$

and $U_k$ and $V_k$ denote first k left singular vectors and first k right singular vectors of T, respectively, an optimal solution is shown in an expression (2) as follows.

$$(A_1^*, A_2^*) = \left( \Sigma_{11}^{-\frac{1}{2}} U_k, \Sigma_{22}^{-\frac{1}{2}} V_k \right). \quad (2)$$

In the following description of the embodiment, the Canonical Correlation Analysis is taken as an example for describing the technology in the present disclosure. However, it should be understood that the present disclosure is not limited thereto.

Figure 2:
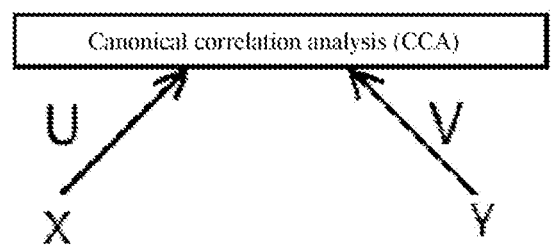
FIG. 2 is a schematic diagram showing an implementation solution for determining correlation between text vectors based on Canonical Correlation Analysis (CCA) according to an embodiment of the present disclosure.

FIG. 2 is a schematic diagram showing an implementation solution for determining correlation between text vectors based on Canonical Correlation Analysis according to an embodiment of the present disclosure.

As shown in FIG. 2, it is assumed that X and Y denote a first text vector and a second text vector respectively, and U and V are linear transform parameters of the Canonical Correlation Analysis. According to the Canonical Correlation Analysis, the parameters U and V are regulated with for example an optimization object of maximizing correlation between the linear-transformed first text vector ($U^T X$) and the linear-transformed second text vector ($V^T Y$). That is, values of the parameters U and V are determined with for example an optimization object of minimizing a covariance between $U^T X$ and $V^T Y$ mathematically. $(\bullet)^T$ denotes matrix transpose. It should be understood that, although the parameters U and V of the Canonical Correlation Analysis are regulated with the object of maximizing the correlation between $U^T X$ and $V^T Y$, the present disclosure is not limited thereto. The parameters of the Canonical Correlation Analysis may be determined with another object of making the correlation satisfy other predetermined condition (for example, a predetermined correlation threshold or a predetermined iteration number) according to actual situations (for example, calculation capacity), which is also suitable for description in following embodiments. The process of determining the linear transform parameters U and V based on an optimization objective function may be implemented by those skilled in the art based on mathematical technology, and is not described in detail here.

With reference to FIG. 1, the text vector generating unit 104 may be configured to obtain a third text vector based on the determined correlation, to represent the same text.

In the example shown in FIG. 2, two text feature representation $U^T X$ and $V^T Y$ for the same text may be obtained based on U and V determined in a case that the correlation satisfies the predetermined condition. The third text vector may be any one of $U^T X$ and $V^T Y$. In other words, the third text vector may be represented as for example $U^T X$ or $V^T Y$, or a vector determined based on at least one of $U^T X$ and $V^T Y$ (for example, a transform form such as weighted averaging of $U^T X$ and $V^T Y$).

It should be understood that, as described above, since the parameters U and V are determined based on the correlation between the first text vector and the second text vector, a vector space where the generated third text vector is located is related to vector spaces where the first text vector and the second text vector are located. In this way, the correlation between the first text vector and the second text vector obtained based on different views is taken into account in generating the third text vector. Therefore, the third text vector is multi-view deep feature representation for the same text, thereby improving performance of subsequent natural language processing. In addition, in the present disclosure, the at least two obtained text feature representation models are fused. Therefore, the technical solution of the present disclosure may be easily implemented and promoted, and it is unnecessary to integrate two corpuses again for training.

An example of processing the text to obtain a new third text vector is described above. Similarly, similar processing may be performed on multiple texts to obtain a corresponding set of the third text vectors, to establish a multi-view text feature representation model.

Preferably, the above correlation determining unit 102 may be further configured to, for each of multiple texts, determine correlation between a first text vector and a second text vector corresponding to each text in the above manner. The text vector generating unit 104 may be further configured to obtain a corresponding third text vector based on the correlation determined for each of the texts.

Preferably, the electronic device 100 may further include a memory 106. The memory 106 may be configured to store the third text vectors for the multiple texts, to establish a multi-view text feature representation model. The multi-view text feature representation model indicates mapping from a text object into a text vector determined based on multiple views, for executing various tasks in subsequent natural language processing.

In addition, preferably, the correlation determining unit 102 may be further configured to, for each of multiple texts, determine correlation between a first text vector and a second text vector corresponding to the text based on correlation regarding other texts. In the above manner, a third text vector corresponding to each of the texts may be determined only based on correlation between the first text vector and the second text vector corresponding to the text, and a new multi-view text feature representation model is established based on a set of the determined third text vectors. However, when a specific set of texts is processed to establish a new text feature representation model, instead of determining the third text vector text by text, parameters of Canonical Correlation Analysis for the set of texts may be determined based on overall correlation between a set of first text vectors and a set of second text vectors for the set of texts. That is, correlation regarding other texts may be taken into account in determining the correlation for a specific text, and a set of third text vectors for the set of texts is determined accordingly, to establish a multi-view text feature representation model.

A specific implementation process of determining correlation between the set of first text vectors and the set of second text vectors with taking the set of texts as a whole using Canonical Correlation Analysis technology may refer to principles of the Canonical Correlation Analysis, and is not described in detail here anymore. In addition, it should be noted that, in an exemplary implementation solution for determining correlation described below with reference to FIG. 3 and FIG. 4, the correlation is determined with taking the set of texts as a whole. Alternatively, the correlation may also be determined text by text, and a set of third text vectors is determined based on the correlation, to establish a multi-view text feature representation model. A specific implementation manner may be selected by those skilled in the art based on an actual situation, which is not limited in the present disclosure.

Figure 3:
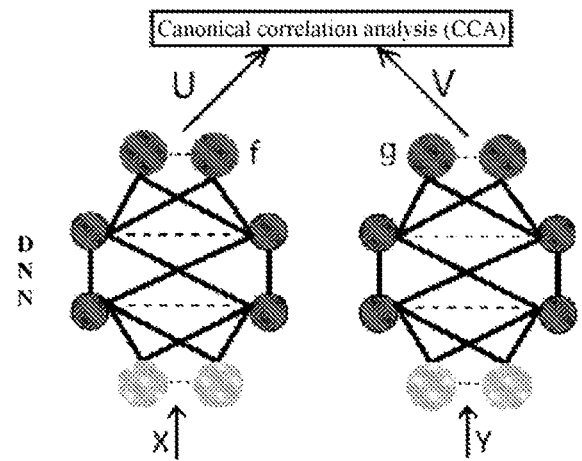
FIG. 3 is a schematic diagram showing an implementation solution for determining correlation between text vectors in a case that a neutral network is further applied to the solution shown in FIG. 2.

Preferably, the above correlation may be further determined using a neutral network. FIG. 3 is a schematic diagram showing an implementation solution for determining correlation between text vectors in a case that a neutral network is further applied to the solution shown in FIG. 2.

As shown in FIG. 3, based on the solution shown in FIG. 2, two independent deep neutral network (DNN) are further added to perform non-linear transform on two inputted text vectors X and Y (X and Y here may also denote two sets of text vectors), and correlation between non-linear transformed vectors is determined using Canonical Correlation Analysis (CAA). The solution may be referred to as Deep Canonical Correlation Analysis (DCCA) hereinafter. It should be understood that although correlation between text vectors is determined with taking a combination of the deep natural network and the Canonical Correlation Analysis as an example, the correlation between text vectors may also be determined through a combination of the deep neutral network and other correlation analysis technology. In addition, two independent deep neutral networks are used for non-linear transform to reduce calculation complexity. Without taking calculation complexity into account, one deep neutral network may be used in practice to perform non-linear transform on the first text vector and the second text vector.

In an example shown in FIG. 3, symbols X, Y, U and V denote the same meaning as described above with reference to FIG. 2, and are not described repeatedly here anymore. f(•) and g(•) denote non-linear transform of the two deep neutral network, respectively, and parameters of the two deep neutral networks are $W_f$ and $W_g$ respectively. In the solution shown in FIG. 3, the first text vector X and the second text vector Y are inputted into a deep neutral network to perform non-linear transform on the first text vector X and the second text vector Y. A variable of the transformed first text vector and a variable of the transformed second text vector are denoted as f(X) and g(Y), respectively. Linear transform is performed on f(X) and g(Y) using the CCA. Parameters (that is, U and V) of the Canonical Correlation Analysis and parameters of the deep neutral network are regulated with taking an object of maximizing correlation between linear-transformed f(X) and the linear-transformed g(Y) (that is, between $U^T f(X)$ and $V^T g(Y)$). The parameters of the deep neutral network may include $W_f$ and $W_g$ described above. In addition, the parameters of the deep neutral network may further include structural parameters (including the number of layers and dimensionality of each layer in the deep neutral network) thereof. Therefore, a third text vector may be determined as $U^T f(X)$ or $V^T g(Y)$, or a vector (for example, a transform form such as weight averaging of $U^T f(X)$ and $V^T g(Y)$) determined based on at least one of $U^T f(X)$ and $V^T g(Y)$. The structural parameters of the deep neutral network may be predefined according to a factor such as an environment of the operation system. In an example of the present disclosure, a predefined structure has four layers, and dimensionality of each layer is 100, 1024, 1024 and 100, respectively.

Mathematically, the above calculation process may be refer to a process of finding U, V, $W_f$ and $W_g$ for minimizing a covariance between $U^T f(X)$ and $V^T g(Y)$. For example, the process may be represented as an expression (3) as follows.

$$\min_{W_f, W_g, U, V} -\frac{1}{N} tr(U^T f(X) g(Y)^T V) \quad (3)$$

$$\text{s.t., } U^T \left(\frac{1}{N} f(X) f(X)^T + r_x I\right) U = I$$

$$V^T \left(\frac{1}{N} g(Y) g(Y)^T + r_y I\right) V = I$$

$$u_i^T f(X) g(Y)^T v_j = 0, \forall i \neq j,$$

where N denotes the number of sets of text vectors, I denotes an identity matrix, and $(r_x, r_y) > 0$ denote regular parameters for covariance estimation.

How to train the model based on the above target optimization function to determine parameters $W_f$ and $W_g$ of the deep neutral network and linear transform parameters U and V of the CCA can be implemented by those skilled in the art based on known teaching knowledge, and is not a focus of the technical of the present disclosure, and thus is not described in detail here. For example, restricted Boltzmann machine (RBM) technology may be used to pre-train a model, and back-propagation such as a stochastic gradient descent (SGD) technology is used. Joint optimization learning is performed on the parameters $W_f$ and $W_g$ of the deep neutral network and linear transform parameters U and V of CCA based on an objective function for maximizing correlation between text vectors. In an example, the parameters of DNN are regulated finely using the above stochastic gradient descent solution. For example, a gradient (delta) of a top layer of DNN is determined, and a parameter $W'_f$ of the top layer of DNN is regulated based on the gradient, for example, $W'_f = W_f +$ regulation coefficient*gradient. Parameters of other layers of DNN are further calculated. The gradient of the top layer of DNN may be obtained by taking a derivative of corr($H_x$, $H_y$) with respect to $H_x$ and $H_y$ according to the objective function (that is, a formula (3)), where corr($H_x$, $H_y$) denotes correlation between $H_x$ and $H_y$, $H_x = U^T f(X)$ and $H_y = V^T g(Y)$.

After the parameters of the deep neutral network and the linear transform parameters of the CCA are trained using local training data or preferably global training data based on the DCCA solution, the parameters $W_f$ and $W_g$ of the deep neutral network and the parameters U and V of the CCA are determined. In this case, for each of all texts to be processed, a first text vector X and a second text vector Y corresponding to the text are inputted a neutral networks f(•) and g(•), respectively, and transform is then performed by the CCA to obtain a target third text vector for example $U^T f(X)$ of the text. Whether the local training data or the global training data is used depending on a set of all texts to be processed. Those skilled in the art may extract some texts from the set of all texts based on a language processing task as local training data for training, to raise efficiency. Also, those skilled in the art may select global training data or local training data based on a requirement for model precision and operation resources.

In addition, it should be noted that, the objective optimization function described above is only exemplary rather than restrictive. An objective function suited for actual needs may be designed by those skilled in the art according to an optimization object based on principles of the present disclosure.

It should be noted that, the above Canonical Correlation Analysis (CCA) and the deep Canonical Correlation Analysis (DCCA) belong to an unsupervised learning process. Therefore, although high correlation between the first text vector and the second text vector may be obtained in a process of determining the correlation, a difference between the third text vector obtained in this case and at least one of the first text vector and the second text vector is large, which results in large distortion, and may affect performance of subsequent natural language processing in some extent. In view of this, in order to further optimize system performance, the first text vector and the second text vector may be reconstructed using an auto-encoder, to regulate parameters by maximizing the correlation while minimizing an auto-encoding error. A third text vector is determined accordingly. An implementation solution in this case is described below with reference to FIG. 4.

Figure 4:
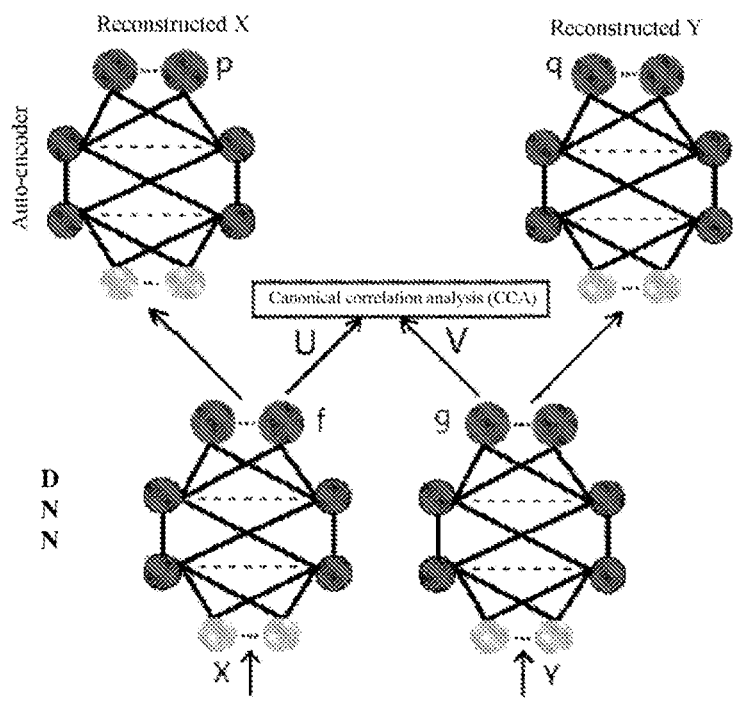
FIG. 4 is a schematic diagram showing an implementation solution for determining correlation between text vectors in a case that an auto-encoder is further applied to the solution shown in FIG. 3.

FIG. 4 is a schematic diagram showing an implementation solution for determining correlation between text vectors in a case that an auto-encoder is further applied to the solution shown in FIG. 3.

As shown in FIG. 4, two auto-encoders are further added based on the solution shown in FIG. 3, to reconstruct a first text vector and a second text vector obtained through non-linear transform of the deep neutral network. The solution is referred to as Deep Canonically Correlated Auto-Encoders (DCCAE) hereinafter. Similarly, as described above, a technology other than the CCA may be applied in the implementation solution to determine correlation.

In the example shown in FIG. 4, symbols X, Y, U, V, f(•) and g(•) denote the same meaning as described with reference FIG. 3, and are not repeated here anymore. Symbols p(•) and q(•) denote non-linear transform of the auto-encoders (that is, a deep neutral network) for reconstructing, respectively, and parameters of the auto-encoders are $W_p$ and $W_q$, respectively.

In the solution shown in FIG. 4, each of a variable f(X) of the first text vector and a variable g(Y) of the second text vector obtained through the non-linear transform of the deep neutral network are inputted to the CCA module and the auto-encoder module, to perform correlation analysis on the variables and reconstruct the variables respectively. The parameters (that is, U and V) of the Canonical Correlation Analysis, the parameters (that is, $W_f$ and $W_g$) of the deep neutral network and parameters (that is, $W_p$ and $W_q$) of the auto-encoders are regulated with an optimization object of minimizing an auto-encoding error (that is, an absolute value |p(f(X))−X| of a different between the reconstructed first text vector p(f(X)) and the original first text vector X and an absolute value |q(g(y))−Y| of a different between the reconstructed second text vector q(g(y)) and the original second text vector Y) while maximizing correlation between the linear-transformed f(X) and the linear-transformed g(Y) (that is, $U^T f(X)$ and $V^T g(Y)$), so that a third text vector is determined as $U^T f(X)$ or $V^T g(Y)$ or a vector determined based on at least one of $U^T f(X)$ and $V^T g(Y)$.

Mathematically, the above calculation process may be for example a process of finding U, V, $W_f$, $W_g$, $W_p$ and $W_q$ for minimizing a sum of the covariance between $U^T f(X)$ and $V^T g(Y)$, an absolute value of the different between p(f(X)) and X and an absolute value of the different between q(g(y)) and Y, which may be represented as for example an expression (4) as follows:

$$\min_{W_f, W_g, W_p, W_q, U, V} -\frac{1}{N} tr(U^T f(X) g(Y)^T V) + \qquad (4)$$

$$\frac{\lambda}{N} (\|X - p(f(X))\|_F^2 + \|Y - q(g(Y))\|_F^2)$$

$$\text{s.t., } U^T \left(\frac{1}{N} f(X) f(X)^T + r_x I\right) U = I$$

$$V^T \left(\frac{1}{N} g(Y) g(Y)^T + r_y I\right) V = I$$

$$u_i^T f(X) g(Y)^T v_j = 0, \forall i \neq j,$$

In the equation (4), the same symbols as the above equation (3) have the same meaning as described above, and are not repeated here anymore. λ denotes a normalization constant for controlling the auto-encoder (in fact, controlling a proportion of the auto-encoding error in the objective function), and is an empirical value or a value determined through the limited number of experiments.

How to perform joint optimization learning on parameters according to the objective expression may refer to the above description for the DCCA solution, and is not repeated here anymore. In addition, it should be understood that the objective function is only exemplary rather than restrictive, and those skilled in the art may modify the objective function based on actual design objects. After the parameters of the deep natural network and the linear transform parameters of the CCA are trained using local training data or global training data based on the DCCAE solution, the parameters $W_f$ and $W_g$ of the deep neutral network and the parameters U and V of the CCA may be determined. For each of all texts to be processed, the first text vector X and the second text vector Y corresponding to the text are inputted to neutral networks f(•) and g(•), respectively, and then transform is performed by the CCA to obtain a target third text vector for example $U^T f(X)$ corresponding to the text.

It should be noted that, although an exemplary implementation solution for determining correlation between text vectors are described above with reference to FIG. 2 to FIG. 4. However, it should be understood that the implementation solution is only exemplary rather than restrictive, and modification can be made onto the above implementation solution by those skilled in the art based on principles of the present disclosure. For example, the optimization objective function may be a preset maximum iteration number or a correlation satisfying a preset threshold, rather than maximizing the correlation. Alternatively, canonical analysis technology other than the CCA may be used, and such variation is considered to fall with the scope of the present disclosure.

The correlation between text vectors is acquired using the above CCA solution, the DCCA solution and the DCCAE solution. Since the text feature is represented from multiple views, a deep multi-view text feature representation model can be acquired, thereby improving performance of executing a task in natural language understanding or the like.

Figure 5:
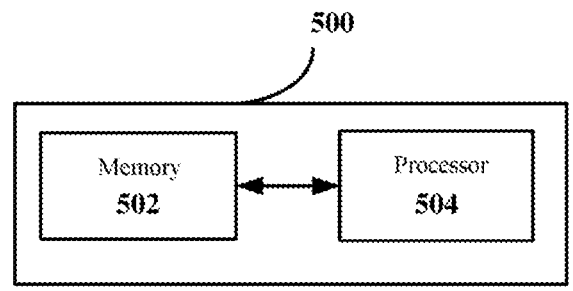
FIG. 5 is a block diagram of a function configuration example of an electronic device for text processing according to an embodiment of the present disclosure.

An embodiment in which text processing is performed using the above obtained multi-view text feature representation model is described with reference to FIG. 5. FIG. 5 is a block diagram of a function configuration example of an electronic device for text processing according to an embodiment of the present disclosure.

As shown in FIG. 5, the electronic device 500 according to the embodiment may include a memory 502 and a processor 504.

The memory 502 may be configured to store the multi-view text feature representation model established above.

The processor 504 may be configured to read the multi-view text feature representation model from the memory 502, map a text object to be processed into a multi-dimensional real number vector based on the multi-view text feature representation model. The text object to be processed may be stored in the memory 502 or an external memory. Alternatively, the text object to be processed may also be inputted by a user. For example, voice is inputted by the user, and the voice is converted into a text through a voice recognition module, and the text is processed with the solution in the present disclosure.

The text object may be for example a word, and the multi-view text feature representation model may be a word feature representation model. In this case, when a phrase, a sentence or a paragraph is processed, the processor 504 may divide the phrase, the sentence or the paragraph into multiple word units using an existing word dividing technology, and map the multiple word units into word vectors based on the word feature representation model, to perform natural language understanding processing such as slot filling, statement classification, automatic translation.

Alternatively, in a case that the established multi-view text feature representation model is a feature representation model of a text object such as a phrase or sentence, instead of dividing the phrase, the sentence or the paragraph into word units, the sentence or the paragraph may be divided into phrases or the paragraph is divided into sentences by direct mapping. The text object is mapped into a text vector based on the multi-view text feature representation model, and the phrase, the sentence or the paragraph is understood based on the text vector. Word dividing processing may be required in an actual processing process. The word dividing processing may implemented by a known technology in the conventional technology, and is not related to the inventive concept of the present disclosure, and thus is not described in detail here.

A process of performing natural language understanding or the other processing using the established text feature representation model is the same as that in the conventional technology, and is not described in detail here repeatedly.

It should be noted here that although the function configuration example of the electronic device for text processing is described above with reference to FIG. 1 and FIG. 5, the function configuration example is exemplary rather than restrictive, and the above function configuration may be modified by those skilled in the art based on principles of the present disclosure. For example, the shown function units may be combined or further divided, alternatively, an additional function unit is added. The variation should be considered to fall within the scope of the present disclosure.

Correspondingly to the above device embodiment, a method embodiment as follows is further provided in the present disclosure. A process example of a method for text processing according to an embodiment of the present disclosure is described with reference to FIG. 6 and FIG. 7.

Figure 6:
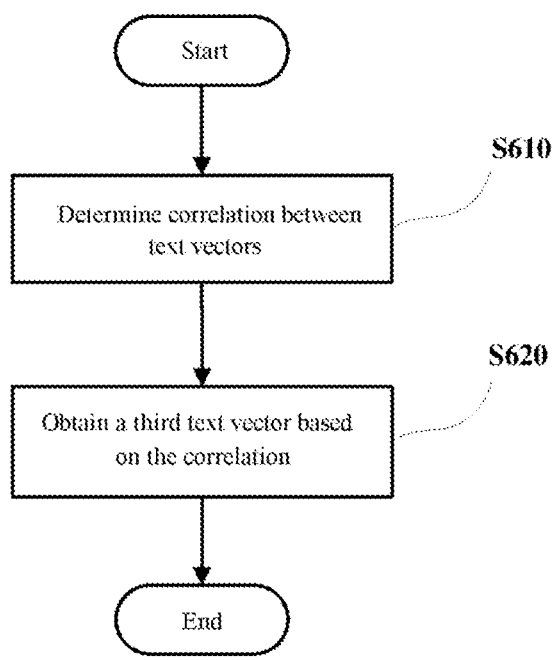
FIG. 6 is a flow diagram of a process example of a method for text processing according to an embodiment of the present disclosure.

FIG. 6 is a flow diagram of a process example of a method for text processing according to an embodiment of the present disclosure. The method corresponds to the embodiment of the electronic device for text processing described above with reference to FIG. 1.

As shown in FIG. 6, in step S610, correlation between a first text vector and a second text vector is determined. The first text vector and the second text vector are multi-dimensional real number vectors generated based on the same text respectively.

In step S620, a third text vector is acquired based on the determined correlation, to represent the text. A vector space where the third text vector is located is related to vector spaces where the first text vector and the second text vector are located.

Preferably, the text corresponds to a word, a phrase constituted by multiple words or a sentence constituted by multiple phrases.

Preferably, the first text vector and the second text vector are based on a first word feature representation model and a second word feature representation model, respectively. The first word feature representation model and the second word feature representation model are obtained based on different word feature representation training mechanisms and/or different training corpuses. The word feature representation training mechanisms may include at least one of a Word2Vec mechanism, a GloVe mechanism and a C&W mechanism. That is, two training mechanisms may be selected from the Word2Vec mechanism, the GloVe mechanism and the C&W mechanism as training mechanisms for the first word feature representation model and the second word feature representation model.

Preferably, the method further includes determining correlation between the first text vector and the second text vector based on Canonical Correlation Analysis, and regulating parameters of the Canonical Correlation Analysis with an object of making the correlation satisfy a predetermined condition.

Preferably, the method further includes: for each of multiple texts, determining correlation between a first text vector and a second text vector corresponding to the text, to obtain a third text vector corresponding to the text; and establishing a multi-view text feature representation model based on the third text vectors corresponding to the multiple texts.

In addition, preferably, the method may further include determining correlation between text vectors based on the above DCCA solution and the DCCAE solution.

A processing process of determining correlation between text vectors using the CCA solution, the DCCA solution, the DCCAE solution or the like and generating a third text vector to establish a multi-view text feature representation model may refer to corresponding description in the above device embodiment, and is not repeated here anymore.

Figure 7:
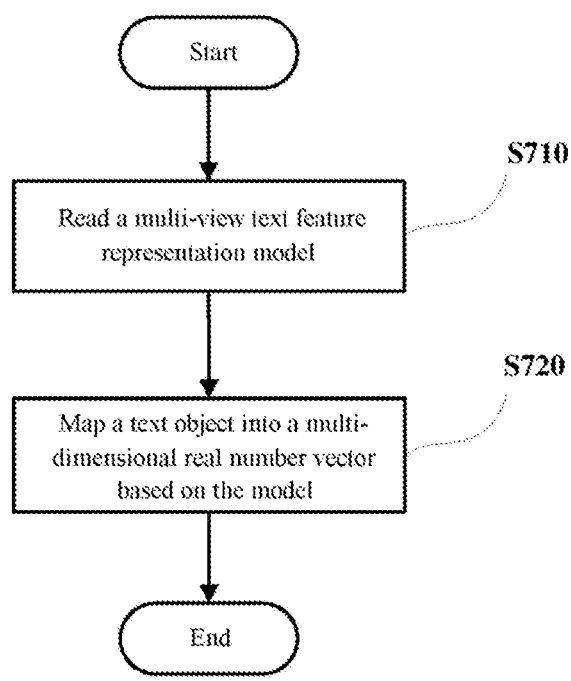
FIG. 7 is a flow diagram of a process example of a method for text processing according to an embodiment of the present disclosure.

FIG. 7 is a flow diagram of a process example of a method for text processing according to an embodiment of the present disclosure. The method corresponds to an embodiment of the electronic device for text processing described above with reference to FIG. 5.

As shown in FIG. 7, in step S710, the multi-view text feature representation model established above is read from the memory. In step S720, a text object to be processed is mapped into a multi-dimensional real number vector based on the multi-view text feature representation model. The text object to be processed may be stored in an internal memory or an external memory. Alternatively, the text object to be processed may also be inputted by a user.

Preferably, the text object may correspond to a word. The method may further include performing text understanding on at least one of a phrase, a sentence and a paragraph containing the text object based on the multi-dimensional real number vector of the text object.

It should be understood that the flow diagrams of the method embodiments shown in FIG. 6 and FIG. 7 are only exemplary rather than restrictive, and those skilled in the art can modify the above processing steps based on the principle of the present disclosure. For example, addition, deletion, combination and/or alteration or the like is performed on the above processing steps, and such variation should be considered to fall within the scope of the present disclosure.

In addition, it should be noted that the method embodiments described with reference to FIG. 6 and FIG. 7 correspond to the device embodiments described with reference to FIG. 1 and FIG. 5, respectively. Therefore, reference may be made to the corresponding description in the above device embodiment for content not described here in detail, which is not repeated here anymore.

In a case that the multi-view text feature representation model established in the embodiment of the present disclosure is applied to execute a task in natural language understanding, processing performance can be optimized effectively. Comparison of processing performance of the text feature representation model constructed in the conventional technology and the multi-view text feature representation models established respectively based on the CCA solution, the DCCA solution and the DCCAE solution in the present disclosure in a case of being applied to execute a slot filling task in spoken language understanding is given below as an example.

It should be understood that although an effect of the present disclosure is verified with taking the slot filling task as an example, the present disclosure can be applied to any other task such as part-of-speech tagging, named entity recognition in the natural language understanding. That is, for example the electronic device 500 in the present disclosure may further include a high-layer natural language processing module such as a slot filling module, a part-of-speech tagging module or a named entity recognition module. In response to the multi-dimensional real number vector obtained by mapping the text to be processed based on the multi-view text feature representation model, the above high-layer language processing module further performs natural language understanding. The slot filling is to extract an element in an inputted sentence, and tag the element. For example, in the comparison experiment, an air travel information system (ATIS) is used as an example of a data set, the slot filling is performed on "a flight from Boston to Seattle today", and a result of the slot filling is as shown in Table 1 as follows.

TABLE 1

Result of Slot Filling

| | Inputted Sentence | | | | | | |
|---|---|---|---|---|---|---|---|
| | Today | From | Boston | To | Seattle | A | Flight |
| Outputted Result of slot Tagging | B-date | 0 | B-starting point | 0 | B-destination point | 0 | 0 |

Today is a starting word (B-date) of date, Boston is a starting word (B-starting point) of the starting point, Seattle is a starting word (B-destination point) of the destination point, "0" denotes a non-element word. It should be noted that, according to the example, the solution of the present disclosure may be applied to a product such as an air travel booking system and a scheduling system. In practice, since the solution in the present disclosure is related to basic word embedding technology, the solution may also be widely applied to multiple other language understanding scenarios.

A study in recent years indicates that a recurrent neutral network (RNN) can realize better performance for the slot filling task. Therefore, two types of RNNs (that is, the Elman RNN and Jordan RNN) are used in the experiment to verify the effect of the present disclosure. The word embedding technology in the experiment comparison includes a random method, a Word2Vec solution, a GloVe solution, a CCA solution based on Word2Vec and GloVe, a DCCA solution and a DCCAE solution.

An index for measuring performance of slot filling is defined as a F1 measure, which indicates a harmonic average of an accurate rate and a recall rate. A comparison result of the experiment is shown in Table 2 as follows.

TABLE 2

Comparison Result of Performance

| | Random method | Word 2Vec | GloVe | CCA | DCCA | DCCAE |
|---|---|---|---|---|---|---|
| Elman RNN | 94.77 | 94.89 | 94.65 | 95.02 | 95.44 | 95.48 |
| Jordan RNN | 93.40 | 93.90 | 93.67 | 94.15 | 94.37 | 94.45 |

It can be seen from the above Table that the multi-view text feature representation model established with the technology in the present disclosure can realize better performance no matter which type of recurrent neutral network is used.

In addition, although not shown in detail, the multi-view text feature representation model established with the technology according to the present disclosure can realize better performance in other natural language understanding task.

It should be understood that machine readable instructions in the memory medium and the program product according to the embodiments of the present disclosure may also be executed to implement the method for text processing described above. Therefore, reference may be made on the above corresponding description for a part not described in detail here, which is not described repeatedly here anymore.

Correspondingly, the memory medium in which the program product described above for storing machine readable instruction codes is carried, and the memory medium on which the multi-view text feature representation model in the present disclosure is carried are covered in the present disclosure. The memory medium includes but is not limited to a soft disc, an optical disc, a magnetic optical disc, a memory card, a memory stick and the like.

Furthermore, it shall be noted that the above-described series of processing and apparatuses can also be implemented with software and/or firmware. In the case of being implemented with software and/or firmware, a program constituting the software is installed from a storage medium or a network to a computer with a dedicated hardware structure, such as a general purpose personal computer 800 shown in FIG. 8. The computer 800 can perform various functions when various programs are installed thereon.

Figure 8:
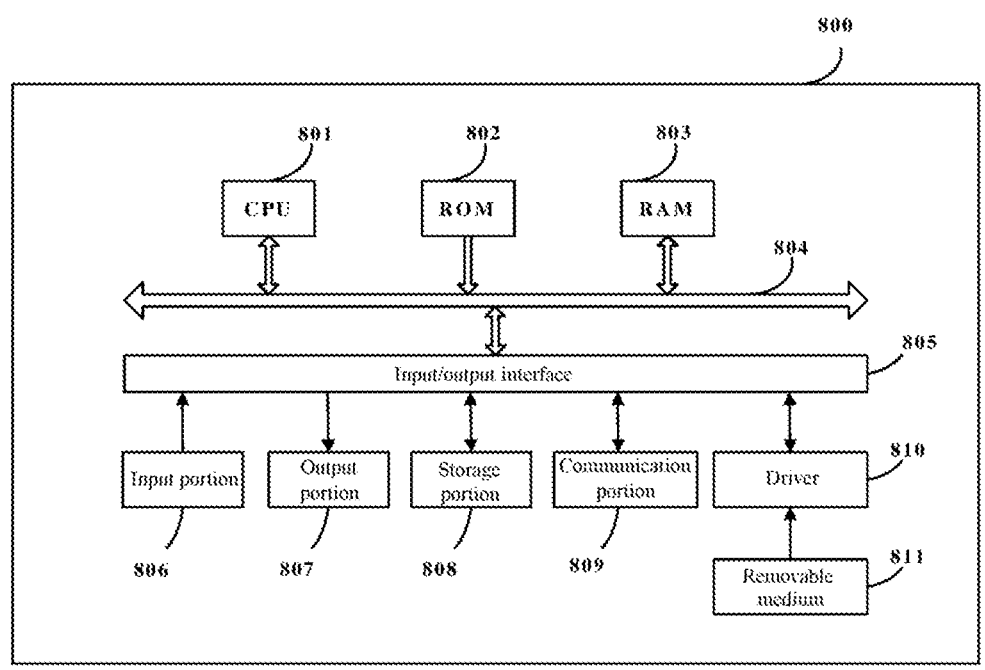
FIG. 8 is an exemplary structure block diagram of a personal computer of an information processing device which can be used in an embodiment of the present disclosure.

In FIG. 8, a Central Processing Unit (CPU) 801 performs various processing according to a program stored in a Read Only Memory (ROM) 802 or a program loaded from a storage portion 808 into a Random Access Memory (RAM) 803. Data required when the CPU 801 performs the various processing is also stored in the RAM 803 as needed.

The CPU 801, the ROM 802 and the RAM 803 are connected to each other via a bus 804 to which an input/output interface 805 is also connected.

The following components are connected to the input/output interface 805: an input portion 806 including a keyboard, a mouse, etc.; an output portion 807 including a display, e.g., a Cathode Ray Tube (CRT), a Liquid Crystal Display (LCD), and a speaker; a storage portion 808 including a hard disk, etc.; and a communication portion 809 including a network interface card, e.g., an LAN card, a modem. The communication portion 809 performs communication processing over a network, e.g., the Internet.

A drive 810 is also connected to the input/output interface 805 as needed. A removable medium 811, e.g., a magnetic disk, an optical disk, a magneto optical disk, a semiconductor memory, can be installed on the drive 810 as needed, so that a computer program read therefrom can be installed into the storage portion 808 as needed.

In the case that the above-described series of processing are performed with software, a program constituting the software is installed from a network, e.g., the Internet, or a storage medium, e.g., the removable medium 811.

Those skilled in the art shall appreciate that such a storage medium will not be limited to the removable medium 811 illustrated in FIG. 8 in which the program is stored and which is distributed separately from the apparatus to provide a user with the program. Examples of the removable medium 811 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively, the storage medium can be the ROM 802, a hard disk included in the storage portion 808, etc., in which the program is stored and which is distributed together with the apparatus including the same to the user.

It should be noted that steps for executing the above series of processing can naturally be executed chronologically in the sequence as described above, but is not limited thereto, and some of the steps can be performed in parallel or individually.

For example, multiple functions of a unit in the above embodiment may be implemented by separate devices. Alternatively, multiple functions implemented by multiple units in the above embodiment may be implemented by separate devices respectively. In addition, one of the above functions may be implemented by multiple units. Such configuration is covered in the technical scope of the present disclosure necessarily.

In the specification, the steps described in the flow diagram not only includes processing executed chronologically in the sequence as described above, but also includes processing executed in parallel or individually rather than chronologically. In addition, needless to say, an order of the steps executed chronologically may be changed suitably.

Although the present disclosure and advantages thereof are described in detail, it should be understood that various changes, replacement and variations can be made without deviating from the spirit and scope of the present disclosure defined by the accompanying claims. Finally, the term "include", "comprise" or any variant thereof in the embodiments of the present disclosure is intended to encompass nonexclusive inclusion, so that a process, a method, an article or a device including a series of elements includes not only those elements but also other elements which have been not listed definitely or an element(s) inherent to the process, the method, the article or the device. Moreover, an expression "comprising a(n) . . . " in which an element is defined will not preclude presence of an additional identical element(s) in the process, the method, the article or the device comprising the defined element(s) unless further defined.

The invention claimed is:

1. An electronic device for text processing, comprising:
a processor configured to:
determine, for each of a plurality of texts, correlation between a first text vector and a second text vector which are multi-dimensional real number vectors generated based on the same text respectively and are based on a first word feature representation model and a second word feature representation model respectively, wherein the first word feature representation model and the second word feature representation model are obtained based on different word feature representation training mechanisms;
obtain a third text vector based on the correlation for each of the plurality of texts, to represent the corresponding text, wherein a vector space where each third text vector is located is related to vector spaces where the corresponding first text vector and the second text vector are located,
determine, for each of a plurality of texts, correlation between a fourth text vector and a fifth text vector which are multi-dimensional real number vectors generated based on the same text respectively and are based on a fourth word feature representation model and a fifth word feature representation model respectively, wherein the fourth word feature representation model and the fifth word feature representation model are obtained based on different word feature representation training mechanisms; and
obtain a sixth text vector based on the correlation for each of the plurality of texts, to represent the corresponding text, wherein a vector space where each sixth text vector is located is related to vector spaces where the corresponding fourth text vector and the fifth text vector are located; and
a memory configured to store the third text vectors of the plurality of texts to establish a first multi-view text feature representation model and to store the sixth text vectors of the plurality of texts to establish a second multi-view text feature representation model, wherein the processor is further configured to:

fuse the first multi-view text feature representation model and the second multi-view text feature representation model to form a third multi-view text feature representation model;

receive one or more words as a text object;

map each of the one or more words of the text object into a corresponding word vector based on the third multi-view text feature representation module;

perform at least one of a slot filling, a statement classification, and a translation based on the one or more word vectors mapped from the one or more words of the text object based on the third multi-view text feature representation module; and present a result of the at least one of a slot filling, a statement classification, and a translation.

2. The electronic device according to claim 1, wherein the text corresponds to a word.

3. The electronic device according to claim 1, wherein the text corresponds to at least one of a phrase constituted by a plurality of words and a sentence constituted by a plurality of phrases.

4. The electronic device according to claim 1, wherein the word feature representation training mechanism comprises at least one of a Word2Vec mechanism, a GloVe mechanism and a C&W mechanism.

5. The electronic device according to claim 1, wherein the first word feature representation model and the second word feature representation model are obtained based on different training corpuses.

6. The electronic device according to claim 1, wherein the processor is further configured to determine the correlation between the first text vector and the second text vector based on Canonical Correlation Analysis, and regulate parameters of the Canonical Correlation Analysis with an object of making the correlation satisfy a predetermined condition.

7. The electronic device according to claim 1, wherein the processor is further configured to process the first text vector and the second text vector using a neural network to obtain a variable of the first text vector and a variable of the second text vector, determine the correlation based on the variable of the first text vector and the variable of the second text vector, and regulate parameters of the neural network with an object of making the correlation satisfy a predetermined condition.

8. The electronic device according to claim 7, wherein the processor is further configured to process the variable of the first text vector and the variable of the second text vector using an auto-encoder to reconstruct the first text vector and the second text vector, and regulate parameters of the auto-encoder and the neural network with an object of further making an error between the reconstructed first text vector and the first text vector and an error between the reconstructed second text vector and the second text vector satisfy a predetermine condition, to determine the correlation.

9. The electronic device according to claim 1, wherein the processor is further configured to, for each of the plurality of texts, determine correlation between a first text vector and a second text vector corresponding to the text further based on the correlation regarding other texts.

10. A method for text processing, comprising:

determining, for each of a plurality of texts, correlation between a first text vector and a second text vector which are multi-dimensional real number vectors generated based on the same text respectively and are based on a first word feature representation model and a second word feature representation model respectively, wherein the first word feature representation model and the second word feature representation model are obtained based on different word feature representation training mechanisms;

obtaining a third text vector based on the correlation for each of the plurality of texts, to represent the corresponding text, wherein a vector space where each third text vector is located is related to vector spaces where the corresponding first text vector and the second text vector are located;

determining, for each of a plurality of texts, correlation between a fourth text vector and a fifth text vector which are multi-dimensional real number vectors generated based on the same text respectively and are based on a fourth word feature representation model and a fifth word feature representation model respectively, wherein the fourth word feature representation model and the fifth word feature representation model are obtained based on different word feature representation training mechanisms;

obtaining a sixth text vector based on the correlation for each of the plurality of texts, to represent the corresponding text, wherein a vector space where each sixth text vector is located is related to vector spaces where the corresponding fourth text vector and the fifth text vector are located;

storing the third text vectors of the plurality of texts to establish a first multi-view text feature representation model and the sixth text vectors of the plurality of texts to establish a second multi-view text feature representation model;

fusing the first multi-view text feature representation model and the second multi-view text feature representation model to form a third multi-view text feature representation model;

receiving one or more words as a text object;

mapping each of the one or more words of the text object into a corresponding word vector based on the third multi-view text feature representation module;

performing at least one of a slot filling, a statement classification, and a translation based on the one or more word vectors mapped from the one or more words of the text object based on the third multi-view text feature representation module; and presenting a result of the at least one of a slot filling, a statement classification, and a translation.

11. The method according to claim 10, wherein the text corresponds to a word.

12. The method according to claim 11, wherein the first word feature representation model and the second word feature representation model are obtained based on different training corpuses respectively.

13. The method according to claim 10, further comprising:

determining the correlation between the first text vector and the second text vector based on Canonical Correlation Analysis, and regulating parameters of the Canonical Correlation Analysis with an object of making the correlation satisfy a predetermined condition.

14. A method for text processing, comprising:

reading from a memory a multi-view text feature representation model established with the method according to claim 10; and mapping a text object to be processed into a corresponding multi-dimensional real number vector based on the multi-view text feature representation model.

15. The method according to claim 14, wherein the text object corresponds to a word.

16. The method according to claim 15, further comprising:
performing text understanding on at least one of a phrase, a sentence and a paragraph containing the text object based on the multi-dimensional real number vector of the text object.

\* \* \* \* \*